3,145,010
THROTTLING AND SHUT-OFF VALVE
Michael Andrew Karr, Jr., Houston, Tex., assignor to Vallee Sales & Engineering Company, Inc., Houston, Tex.
Filed Apr. 16, 1962, Ser. No. 187,540
2 Claims. (Cl. 251—210)

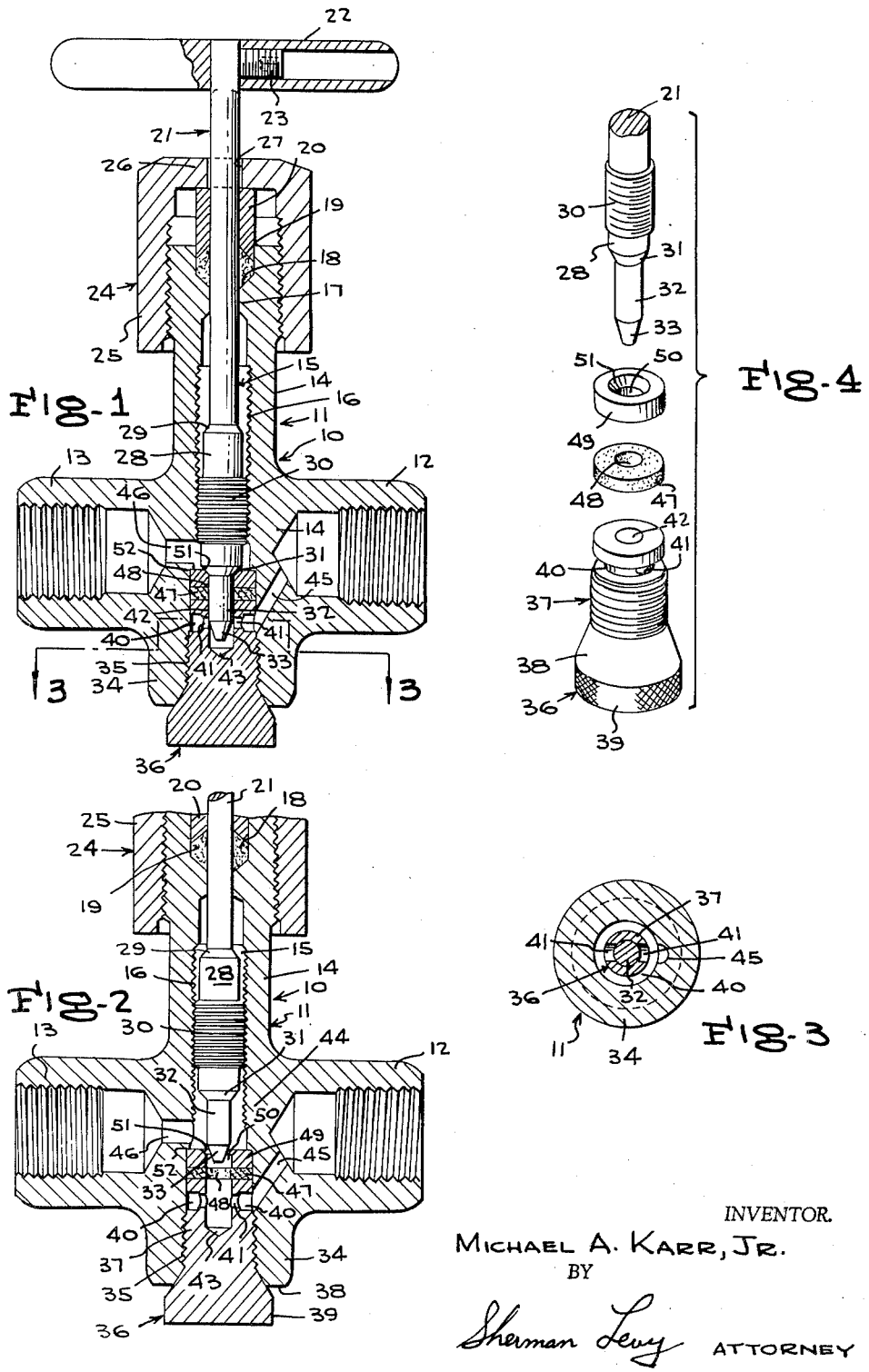

This invention relates to a throttling and shut-off valve which is constructed so as to prevent or eliminate shortcomings or disadvantages of present valves, and a primary object of the present invention is to provide a throttling and shut-off valve which is easy to operate under high pressure, and wherein the seating elements are readily replaceable without removing the valve body from its connecting lines.

A further object is to provide a throttling and shut-off valve which permits convenient replacement of the seal elements by providing a seat which is readily removable from the bottom of the valve, and wherein the valve of the present invention is constructed so that the erosive effects of flow are substantially precluded.

Still another object is to provide such a throttling and shut-off valve that is economical to manufacture and efficient in operation and which is rugged in structure and foolproof in use.

These and other objects of the invention will become apparent from a reading of the following specification and claims, together with the accompanying drawing, wherein like parts are referred to and indicated by like reference characters and wherein:

FIG. 1 is a vertical sectional view taken through the throttling and shut-off valve of the present invention, and with parts broken away, and showing the parts in closed position.

FIG. 2 is a fragmentary sectional view generally similar to FIG. 1 but showing the valve in open position.

FIG. 3 is a sectional view taken on the line 3—3 of FIG. 1.

FIG. 4 is a fragmentary perspective view showing certain of the parts disassembled.

Referring in detail to the drawings, the numeral 10 indicates a throttling and shut-off valve of the present invention which is shown to comprise a body that is indicated generally by the numeral 11, and as shown in FIG. 1 the body 11 is provided with diametrically opposed integral inlet and outlet ports 12 and 13. The body 11 further includes an upstanding section 14 which has a hollow interior as indicated by the numeral 15, and the numeral 16 indicates an internally threaded surface on the upstanding portion 14. As shown in the drawings there is provided adjacent the upper end of the section 14 an inwardly disposed shoulder 17 which has a central opening 18 therein, and the numeral 19 indicates packing which is arranged just above the shoulder 17, there being a follower 20 abutting and engaging the packing 19. The numeral 21 indicates a movable stem which has a handle 22 connected to the upper end thereof as, for example, by means of a set screw 23.

The numeral 24 indicates a cap which includes a depending skirt portion 25 that is arranged in threaded engagement with the section 14, and the cap 24 further includes a top portion 26 which has a central opening 27 therein for the projection therethrough of the stem 21, FIG. 1.

The stem 21 includes a lower integral enlarged portion 28 which has a tapered surface 29 contiguous to the upper end thereof, and the numeral 30 indicates an externally threaded portion of the stem 21 which is arranged in threaded engagement with the threaded surface 16 in the body. There is provided a tapered or beveled surface 31 at the lower end of the enlarged portion 28, and the tapered surface 31 merges into a cylindrical section 32, and formed on the lower end of the stem is a tapered tip 33, for a purpose to be later described.

Formed integral with the body 11 or secured thereto and depending therefrom is a generally cylindrical internally threaded flange portion 34 which is threaded internally as at 35. The numeral 36 indicates a seat member which has an upper threaded section 37 that is arranged in threaded engagement with the threaded portion 35, and the seat member 36 further includes an intermediate tapered section 38 as well as a lower enlarged section 39, FIG. 2.

The seat member 36 is provided with an annular groove 40, and the numeral 41 indicates an opening or port in the upper section of the seat member which has its ends communicating with the groove 40, FIG. 3. There is provided in the upper section of the seat member 36 a vertically disposed recess or opening 42 which has its lower end terminating at the point 43.

The numeral 44 indicates a wall portion formed integral with the body 11, and the wall portion 44 has an inclined passageway or port 45 therein which establishes communication between the inlet port 12 and the groove 40. The wall portion 44 also has an outlet opening 46 therein.

As shown in FIG. 4, a circular packing element 47 is adapted to be arranged contiguous to the upper end of the seat member 36, and the packing element 47 has a central opening 48 therein which is in alignment with the recess 42. The numeral 49 indicates a load ring which is adapted to be arranged contiguous to the upper surface of the packing element 47, and the load ring 49 has a central opening 50 as well as a tapered or beveled portion 51.

From the foregoing, it will be seen that there has been provided a throttling and shut-off valve, and in use with the parts arranged as shown in the drawings, it is to be noted that the port 12 is adapted to be connected to a suitable fitting, line or the like through which fluid is adapted to flow, and with the parts arranged as shown in FIG. 2, the fluid can flow through the port 12, through the passageway 45, through the groove 40, then through the port 41 into the recess 42 and up through the openings 48 and 50 and then out through the opening 46 and then through the port 13 to any desired or required location.

By manually gripping and rotating the handle 22, the stem 21 can be adjusted to the desired position since the threaded portion 30 is arranged in threaded engagement with the threaded surface 16 so that, for example, the parts can be moved from the open position of FIG. 2 to the closed position of FIG. 1, and with the parts in the position of FIG. 1 the flow of fluid though the valve is blocked or shut off.

The parts can be made of any suitable material and in different shapes or sizes.

It is known of course that numerous types of valves for throttling and shut-off service utilizing the Globe needle construction have been heretofore designed and utilized. A typical needle valve affects a seal on the same surface which is used for throttling, and in the event of erosion or corrosion of the throttling/seating surface, it is often difficult or impossible to affect a seal. The situation is particularly evident on valves used in high pressure service where the slightest leakage produces severe erosive damage to the seating surfaces.

The valve of the present invention is constructed so as to prevent or eliminate the above shortcomings of existing valves, and the present invention is easy to operate under high pressure, and the valve is constructed so that the seating elements are replaceable without removing the valve body proper from its connecting lines.

With further reference to the drawings, effluent pressure enters port 12 and the annular groove or passage 40 around the seat, and it then passes through radial drilled holes 41 in the seat and is imposed against the needle portion of the stem 21.

It is to be noted that by screwing the stem 21 downward toward the seat 36, the shoulder 31 on the stem is caused to press against the load ring 49 which in turn imposes a load on the resilient seat packing 47. As soon as a preliminary seal is affected, the resilient seat packing 47 will achieve an internal pressure equivalent to the upstream pressure. Further loading by the stem and load ring will result in an internal packing pressure greater than the upstream pressure, effectively producing a seal. By its construction and by virtue of close tolerance machining of the load ring 49, seat packing 47 and seat 36, the net effect is to produce a seal similar in action to O-ring packing. As will be noted, the seal is affected by controlled radial deformation of the seat packing which results in the seal occurring on the body inside diameter and the stem outside diameter as well as the packing faces. The controlled dimensional tolerances of the assembly effectively preclude the extrusion of the resilient seat packing 47.

Furthermore, any throttling action, either deliberate or as a result of opening and closing the valve, will cause erosion only on the tapered portion of the stem and the downstream edges of the load ring 49. The seat packing at the time of stem withdrawal is effectively pressure balanced or confined by the load ring, body and stem, so as to preclude damage by the erosive effects of flow.

Also, to some degree, corrosion or erosive damage to the stem outside diameter will have no effect on the seal that is obtainable, since additional stem pressure will cause the resilient seat packing to conform to these irregularities. However, extensive damage will require replacement of the seal elements.

The valve of the present invention is constructed so as to provide for replacement of the seal elements by providing a seat 36 which is removable from the bottom of the valve. This seat 36 simply unscrews from the valve bottom due to the provision of the threaded portions 35 and 37. When in place, the internal valve cavity is sealed from the outside by the conical seating surface of the seat. By screwing the stem 21 downward, the load ring 49, seat packing 47, and stem 21 are forced out of the body. The seal elements can then be readily replaced by assembling new parts into the valve body and reversing the disassembly procedure.

The throttling and shut-off valve of the present invention is constructed so that it includes a valve stem which is adapted to have a means to provide an axial load, such as threaded, pneumatic or hydraulic cylinder arrangement, spring loading or other loading means, and wherein there is provided at its seating end a smooth cylindrical or other cross-sectional shape which is provided with a load bearing shoulder larger than the cross-sectional shape, and the outside surface of the cross sectional shape is to be considered the sealing surface.

The valve stem has the tip or end which is shaped or formed to provide a distinct throttling action or characteristic and this is possible because the tip or end of the stem is not used for affecting the valve seal. Also, the load plate or disk has an internal hole which is shaped so as to closely conform to the cross-sectional shape of the valve stem at its seating end and is of such a design as to remain comparatively rigid under load as provided by the valve stem. The load plate has an outside diameter or shape somewhat larger than the load bearing shoulder of the stem so as to provide a measure of unsupported area.

Also, the packing element has an outside configuration which is identical to the load plate with an internal hole shape that closely conforms to the shape of the hole in the load plate, and this element is deformable both axially and radially either by virtue of using resilient materials such as rubber, plastics or composition materials, or by using metallic materials which are designed to provide the required resiliency such as certain washers or the like. The backing load pad has an internal hole shape which closely conforms to the shape of the hole in the packing and load plate, and in the particular design illustrated this load pad consists of a threaded plug entering the valve body from the end opposite the bonnet cap side.

The valve body 11 is of such dimensions as to contain the elements previously described and is provided with a restraining shoulder which is indicated by the numeral 52, and the restraining shoulder 52 prevents the load plate 49 from moving towards the stem.

The combination of these elements provides a valve which seals in the following manner. The stem being moved toward and into the load plate 49, packing 47 and backing load pad by a load induced by the aforesaid means and producing a direct transmittal of this load through the load plate to the packing element, and this load is resisted by the backing load pad.

This mechanical load is adapted to provide an internal stress in the packing element sufficient to cause it to yield and conform to the stem outside seal surface and the body cavity housing the sealing elements. At this time which is the initial sealing, the line pressure will impart an additional internal pressure to the packing element imparting a sealing characteristic similar to an O-ring seal. Additional load applied to the stem will then insure complete integrity of the seal obtained.

The elements are combined in a unique manner to provide a valve which has a throttling surface independent of the sealing surface. For example, the tip or end 33 provides the throttling characteristic and the outside surface provides the sealing function.

Also, the elements are combined to provide a valve which protects the packing elements by complete confinement of the packing while under pressure and balances the pressure loading on the packing element when the valve is open. Furthermore, the elements are arranged to provide a valve which can be easily sealed since the force required to deform the packing element is a small portion of the total pressure load against the stem. In addition the elements are arranged to provide a valve whose sealing elements are easily removed and replaced when worn. That is, the backing load pad is removed and the seal elements are jacked out of the valve by loading the stem. Also, the valve is such that the sealing elements may be damaged to some extent and yet be able to seal by virtue of the packing element resiliency which is capable of some compensation for such damages. The previous discussion is based on the assumption that the side under the stem and packing is the pressure side of the valve.

Minor changes in shape, size and rearrangement of details coming within the field of invention claimed may be resorted to in actual practice, if desired.

What is claimed is:

1. A throttling and shut-off valve comprising a body having diametrically opposed inlet and outlet ports, said body having an upstanding section which is provided with an internally threaded surface, there being an inwardly disposed shoulder in the upper portion of said upstanding section, said shoulder having a central aperture therein, packing arranged above said shoulder, a follower above said packing, a cap mounted on the upstanding section of said body, a stem extending through said cap, a handle connected to the upper end of said stem, said stem including a lower enlarged portion which is threaded for a portion of its length for threadedly engaging the threaded surface in the interior of the upstanding section of the body; said stem further including tapered surface merging into a cylindrical section, and a tapered tip on the lower end of the stem, a cylindrical internally threaded flange portion depending from said body; a seat member having an upper threaded section threadedly engaging said flange portion, said seat member further including an intermediate tapered section and a lower enlarged section, there being an annular groove in the upper section of said seat member, a port in the upper section of said seat member communicating with said groove, the upper section of said seat member having a vertically disposed recess therein which communicates with said last named port, said body further including an inner wall portion which has a passageway and an opening therein, said passageway establishing communication between the inlet port of the body and the groove in the seat member, a circular packing element arranged above said seat member, and a load ring positioned above said packing element.

2. The structure as defined in claim 1 wherein said load ring and packing element have central openings therein which register with the recess in said seat member, said load ring having a beveled tapered surface contiguous to the central portion thereof.

References Cited in the file of this patent

UNITED STATES PATENTS

| | | |
|---|---|---|
| 806,309 | White | Dec. 5, 1905 |
| 1,716,195 | Stockstrom | June 4, 1929 |
| 2,226,851 | Franck | Dec. 31, 1940 |
| 2,931,385 | Carlisle | Apr. 5, 1960 |
| 3,071,344 | Bank | Jan. 1, 1963 |